(12) United States Patent
Spurr et al.

(10) Patent No.: US 6,484,448 B2
(45) Date of Patent: Nov. 26, 2002

(54) METHOD OF ASSEMBLING A VEHICLE DOOR MODULE

(75) Inventors: Nigel Victor Spurr, Birmingham (GB); Laurent Arquevaux, Sully sur Loire (FR); Philippe Delire, Beaumont sur Sarthe (FR)

(73) Assignee: Meritor Light Vehicle Systems-France, Sully sur Loire (FR)

( * ) Notice: Subject to any disclaimer, the term of this patent is extended or adjusted under 35 U.S.C. 154(b) by 0 days.

(21) Appl. No.: 09/894,667

(22) Filed: Jun. 28, 2001

(65) Prior Publication Data

US 2001/0037608 A1 Nov. 8, 2001

Related U.S. Application Data

(62) Division of application No. 09/378,283, filed on Aug. 20, 1999, now abandoned.

(30) Foreign Application Priority Data

Aug. 21, 1998 (FR) .............................. 98 10637

(51) Int. Cl.⁷ ................................................. E06B 3/00
(52) U.S. Cl. ........................................................ 49/506
(58) Field of Search .......................... 49/502, 503, 352, 49/506; 296/146.5, 146.7

(56) References Cited

U.S. PATENT DOCUMENTS

| 5,535,553 A | * | 7/1996 | Staser et al. ................. 49/502 |
| 5,855,096 A | * | 1/1999 | Staser et al. ................. 49/503 |
| 5,924,245 A | * | 7/1999 | Manuel et al. ............... 49/352 |
| 6,076,882 A | * | 6/2000 | Szerdahelyi et al. ..... 296/146.1 |

FOREIGN PATENT DOCUMENTS

| EP | 0 406 034 A | 1/1991 |
| EP | 0 495 712 A | 7/1992 |
| EP | 0 811 516 A | 12/1997 |

OTHER PUBLICATIONS

Search Report documents from Apr. 26, 1999.

* cited by examiner

Primary Examiner—Jerry Redman
(74) Attorney, Agent, or Firm—Carlson, Gaskey & Olds

(57) ABSTRACT

A vehicle door module includes a lock attached to a constituent support panel of the module, which is shaped to press against the periphery of an opening formed in an interior panel of a door frame. The support panel being identical for a vehicle with two doors and for a vehicle with four doors. The lock assembly includes lugs for fastening the lock to the panel with lugs that differ for the type of vehicle. A first lug of a length suited to a two-door vehicle, and a second lug that is suited to a four-door vehicle. This arrangement makes it possible to use the same standard module for vehicles of different types and therefore to cut down on the corresponding investment needed for producing the module.

8 Claims, 2 Drawing Sheets

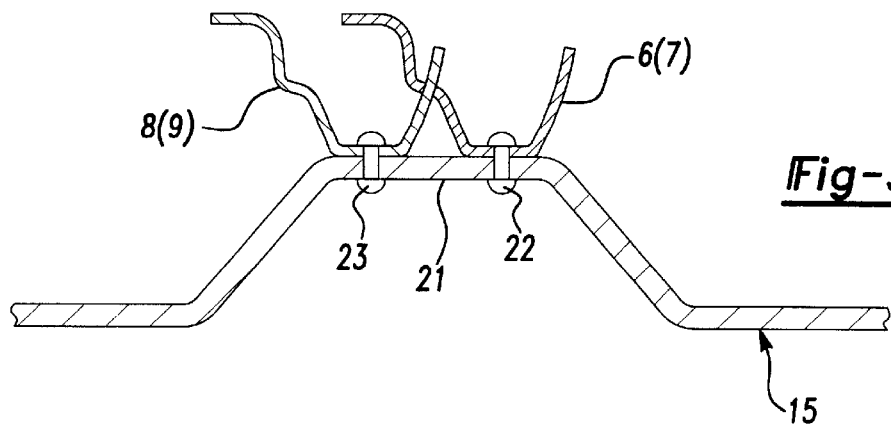
Fig-3
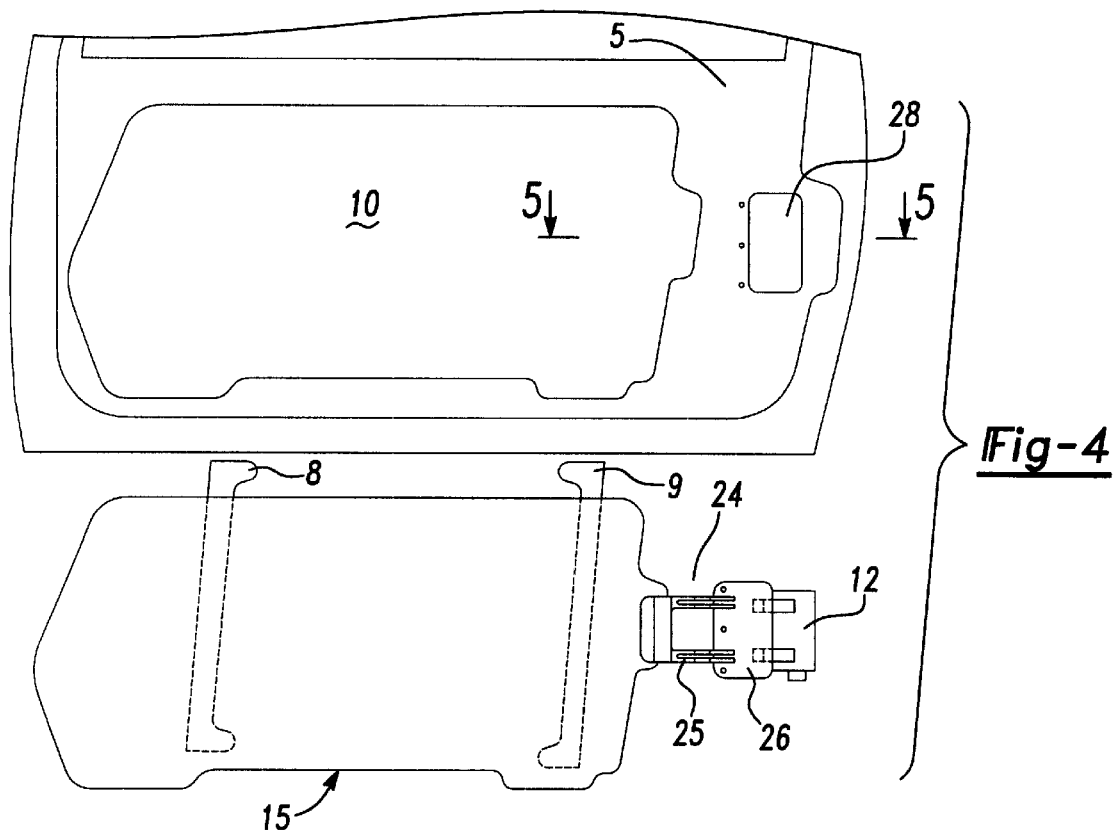
Fig-4
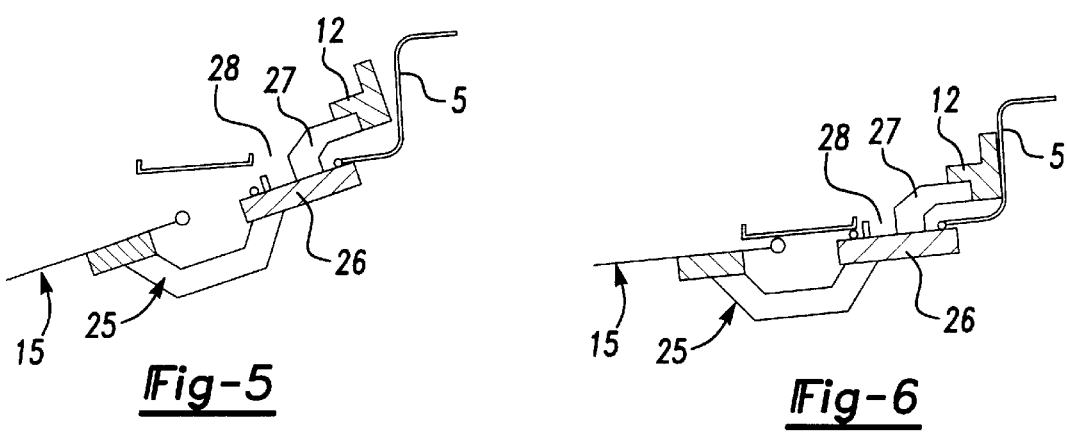
Fig-5
Fig-6

METHOD OF ASSEMBLING A VEHICLE DOOR MODULE

BACKGROUND OF THE INVENTION

The present application is a divisional of U.S. patent application Ser. No. 09/378283, filed Aug. 20, 1999, now abandoned, which claims priority to France Patent Application No. 98 10637, filed Aug. 21, 1998.

The present invention relates to an assembly comprising a vehicle door module equipped with a lock, and means of fastening the lock to a constituent support panel of the module. The latter is shaped to be able to press against the periphery of an opening formed in an interior panel of the vehicle door frame.

These door modules press against the periphery of the opening in the door frame in a sealed manner and are equipped with functional equipment such as the window lifter, lock, etc. The module consists of an equipment support panel made of sheet metal, fitted with a peripheral seal which closes the door opening, this opening being used to feed the equipment that the sheet metal panel supports into the inside of the door. Conventionally, the module support panel is specific to each type of vehicle. The panel thus differs from a two-door vehicle to a four-door vehicle, the support panel being longer in the case of a four-door vehicle. This results in substantial investment for the pressing of the module support sheet, because a module specific to each type of vehicle is needed.

Accordingly, it is desirable to provide a standard module which can be used with equal ease on two-door vehicles and on four-door vehicles.

SUMMARY OF THE INVENTION

According to the present invention the door module assembly and a means of fastening a lock assembly includes a support panel which is identical for a two-door vehicle and for a four-door vehicle, and lugs for fastening the lock to the panel which lugs differ for the two types of vehicle, namely a first lug of a length suited to a two-door vehicle and a second lug, which is shorter than the first, suited to a four-door vehicle.

According to the method also envisaged by the invention, use is made of an identical module for the two types of vehicle, and of means of fastening the lock to the module which are specific to each type of vehicle.

Thus, the same module can be used as standard for both types of vehicle, simply by replacing the short lug by a longer lug for fastening the lock when changing from a four-door vehicle to a two-door vehicle.

According to an advantageous embodiment of the invention, formed in the module support panel are pressed zones to which window lifter guide rails may be fastened, the longitudinal position for fastening each rail being adjustable in each pressed zone according to whether the window lifter is being fitted to a two-door vehicle or to a four-door vehicle; each pressed zone thus has fastening points which are longitudinally offset for the two types of vehicle.

The same standard module can therefore be used very easily for any one of the two types of vehicle, which means that all that is required is for the fastening points specific to the type of vehicle being assembled to be selected in the pressed zone of the support panel.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a view in part section on a larger scale on 3/3 of FIG. 2;

FIG. 4 is a view in elevation of a vehicle door and of a corresponding standard module, according to a second embodiment of the invention;

FIG. 5 is a view in section on 5/5 of FIG. 4, showing the first stage of an operation of introducing the lock fitted to the module into the door frame; and FIG. 6 is a view similar to FIG. 5 showing the standard module and the lock assembled with the door frame.

DETAILED DESCRIPTION OF THE PREFERRED EMBODIMENT

Figure 1:
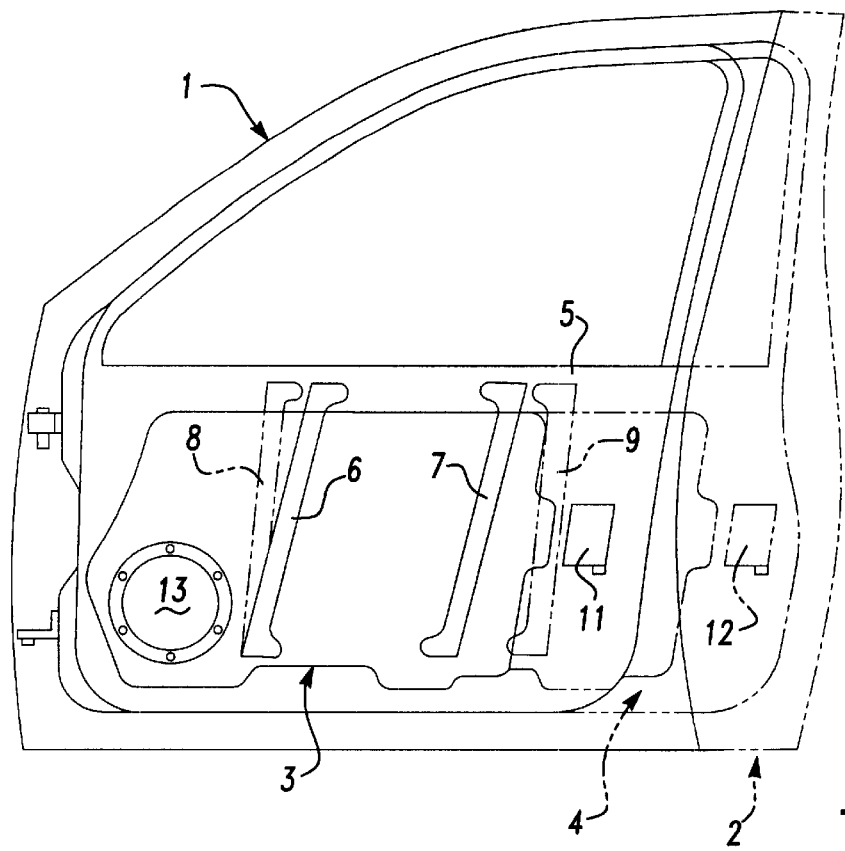
FIG. 1 is a diagrammatic view in elevation from the inside of a motor vehicle door, illustrating the prior art to the present invention.

FIG. 1 shows a door 1 depicted in continuous line, of a four-door vehicle, and a door 2, illustrated partially in chain line, of a two-door vehicle, the rear of the vehicle not being depicted.

The difference between the doors 1 and 2 essentially lies at the rear, the door 2 necessarily being longer than the door 1. Correspondingly, according to the prior art, each door 1 and 2 is equipped with its own respective module 3, 4, the outline of which is adapted to that of a corresponding opening of an interior panel 5 of the frame of the door 1 or 2.

As the door opening of a two-door vehicle with doors 2 is longer than the door opening for a door 1 of a four-door vehicle, the panel 4 is therefore markedly longer than the panel 3 of a four-door vehicle. On each of the panels, the locations of the respective guide rails 6, 7 (module 3) and 8, 9 (module 4) are different (if the window lifter mechanism is of the type with two guide rails). Each module 3, 4 is also equipped, at its rear, with a means of fastening the respective lock 11, 12 and, as appropriate, is provided with other functional equipment items such as a speaker 13.

Figure 2:
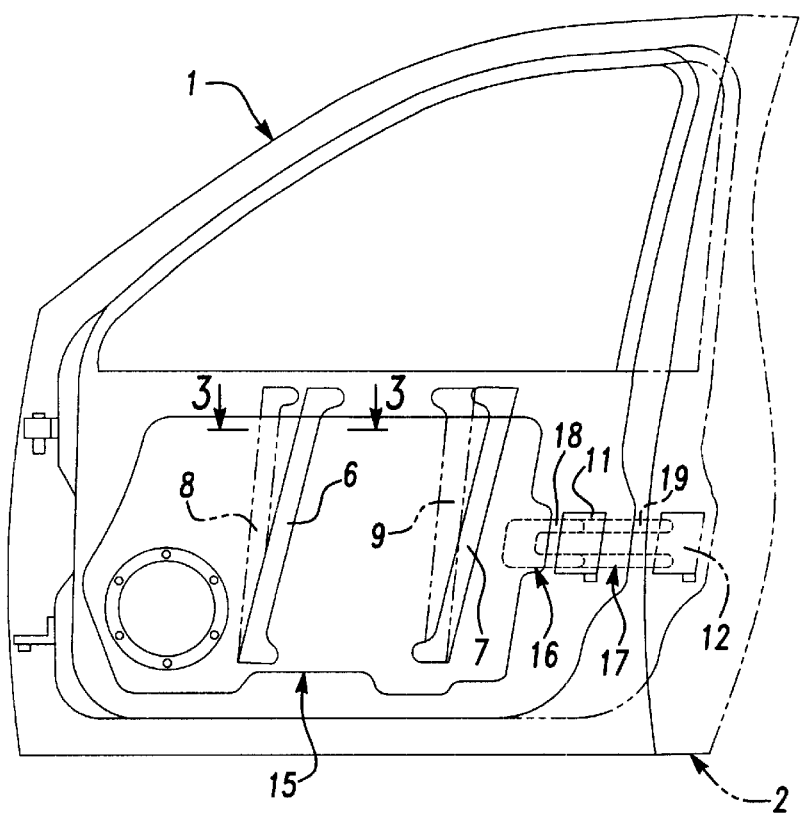
FIG. 2 is a diagrammatic view in elevation similar to FIG. 1, illustrating a first embodiment of the door module assembly according to the invention.

In the first embodiment of the assembly envisaged by the invention (FIG. 2), this assembly comprises a standard door module 15 which can be used with equal ease for the door 1 of a four-door vehicle and for the door 2 of a two-door vehicle. Of course, the opening 10 in the door frame 5, against the periphery of which the module 15 is pressed, is identical for both types of door 1 and 2. The module 15 comprises a sheet metal support panel similar to the panel which makes up the module 3.

The standard panel 15 is supplemented either, in the case of a four-door vehicle, by a short lateral lug 16 for fastening lock 11 or, in the case of a door 2 of a two-door vehicle, by a lug 17 which is markedly longer than the lug 16. As depicted diagrammatically, the lugs 16, 17 may have the overall shape of a U, the central part of which is fastened by any appropriate means to the rear side of the standard module 15, while the respective arms 18 or 19 are secured by any appropriate means to the corresponding lock 11 or 12.

Furthermore, formed in the support panel 15 are pressed zones such as the zone 21, to which the respective window lifter guide rails (if the window lifter in question is of this type) may be fastened. Thus, formed on each front rail 6 or 8 and each rear rail 7 or 9 is at least one pressed zone such as 21 and, as appropriate, two zones superimposed at an appropriate distance.

In each pressed zone 21, the longitudinal position of the fastening for each rail 6 or 8 (or 7 or 9) is adjustable according to whether the window lifter is being fitted to a two-door vehicle or to a four-door vehicle. Each pressed zone such as 21 therefore has two fastening points which are longitudinally offset for the two types of vehicle.

The points are embodied in the example illustrated in FIG. 3 by rivets 22, 23 for respectively fastening the rail 6 (or 7) and the rail 8 (or 9), the rail 6 being appreciably further back than the rail 8 and more steeply inclined to the vertical. By contrast, the rear rail 9 of a two-door vehicle is less steeply inclined with respect to the vertical than the rail 7 of a four-door vehicle, and offset a little further forward.

Of course the rivets 22, 23 may be replaced by any other appropriate means of fastening.

In the second embodiment illustrated in FIGS. 49 to 6, the module 15 is supplemented by a system comprising a lug 24 for supporting the lock 12 which system is specifically adapted to the two-door vehicle. Specifically, in this case, the lug that makes up the device 24 consists of a first part 25 forming a U-shaped lug and of a plate 26 which may be fastened to the ends of the branches of the lug 25 by any appropriate means, not depicted, for example screw, bolt, clip, etc.

The lock 12 may be fastened by an element 27 to the plate 26 on the opposite side to the lug 25 so as to allow the lock 12 to be introduced through a slot 28 in the door frame 5, the lug 25 having already been fastened to the standard panel 15. Once this operation has been completed, all that is required is for the panel assembly 15 to be brought down onto the outline of the opening 10 in the door frame 5 (FIG. 6).

The arrangement of the fastening system 24 with the lug 25 and the plate 26 makes it easier to assembly the module 15 with the door frame 5 if the support lug is excessively long, as may be the case in certain two-door vehicles.

The fastening system 24 is not called for and cannot be used on a four-door vehicle, and this being the case it is removed and replaced by a lug such as 16.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of assembling a vehicle door module to a vehicle door comprising the steps of:
   (1) providing a panel of a standard shape having a lock assembly attached thereto;
   (2) fitting said panel along a periphery of an opening of a standard shape in an interior panel of one of a multiple of different vehicle door frames having the opening of the standard shape; and
   (3) selecting one of a plurality of different replaceable lugs then attaching selected replaceable lug to said lock assembly of a length particular to a door frame selected in said step 2.

2. A method as recited in claim 1, further comprising the steps of:
   forming a fastening area within the panel having a plurality of fastening points; and
   attaching a window lifter guide rail to at least one of the plurality of fastening points such that said panel is mountable to a door frame selected in said step 2.

3. A method of assembling a vehicle door module to a vehicle door comprising the steps of:
   (1) providing a panel of a standard shape having a lock assembly attached thereto and a fastening area having a multiple of fastening points;
   (2) fitting said panel along a periphery of an opening of a standard shape in an interior panel of one of a multiple of different vehicle door frames having the opening of the standard shape;
   (3) attaching a window lifter guide rail to at least one of the multiple of fastening points particular to a door frame selected in said step 2; and
   (4) selecting one of a plurality of different replaceable lugs then attaching selected replaceable lug to said lock assembly of a length particular to a door frame selected in said step 2.

4. A method as recited in claim 3, wherein said step (1) further comprises:
   passing said lock assembly through a slot in the panel; and
   covering the slot with a plate fixedly extending from the lock.

5. A method as recited in claim 3, wherein said step (1) further comprises:
   mounting the replaceable lug to a first side of a plate;
   fixedly mounting the lock to the plate opposite the replaceable lug;
   passing the lock assembly through a slot in the panel; and
   covering the slot with the plate.

6. A method of assembling a vehicle door module to a vehicle door comprising the steps of:
   (1) providing a panel of a standard shape having a fastening area having a multiple of fastening points;
   (2) fitting said panel along periphery of an opening of a standard shape in an anterior panel of one of a multiple of different vehicle door frames having the opening of the standard shape;
   (3) attaching a window lifter guide rail to at least one of the multiple of fastening points particular to door frame selected in step 2;
   (4) mounting a replaceable lug of a length particular to the door frame, selected in said step 2 to a first side of a plate;
   (5) fixedly mounting a lock to the plate opposite the replaceable lug;
   (6) passing the lock assembly through a slot in the panel; and
   (7) covering the slot with the plate.

7. A method of assembling a vehicle door module to a vehicle door comprising the steps of:
   (1) providing a panel of a standard shape having a lock assembly attached thereto and a fastening area having a multiple of fastening points;
   (2) fitting said panel along a periphery of an opening of a standard shape in an interior panel of one of a multiple of different vehicle door frames having the opening of the standard shape; and (3) selecting one of a plurality of different window lifter guide rails then attaching selected window lifter guide rail to at least one of the multiple of fastening points particular to a door frame selected in said step 2.

8. A method as recited in claim 7, further comprising the steps of:

attaching a second lifter guide rail parallel to said selected window lifter guide rail.

* * * * *